United States Patent
Yagyu et al.

(10) Patent No.: US 12,500,483 B2
(45) Date of Patent: Dec. 16, 2025

(54) LIQUID COOLING STRUCTURE FOR MOTOR

(71) Applicant: KUBOTA CORPORATION, Osaka (JP)

(72) Inventors: Sumio Yagyu, Osaka (JP); Shinsuke Kotani, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 243 days.

(21) Appl. No.: 18/230,301

(22) Filed: Aug. 4, 2023

(65) Prior Publication Data

US 2024/0072611 A1    Feb. 29, 2024

(30) Foreign Application Priority Data

Aug. 25, 2022  (JP) .................. 2022-134221
Jun. 12, 2023  (JP) .................. 2023-096319

(51) Int. Cl.
*H02K 9/193*  (2006.01)
*H02K 5/20*   (2006.01)

(52) U.S. Cl.
CPC ............ H02K 9/193 (2013.01); *H02K 5/203* (2021.01)

(58) Field of Classification Search
CPC ............ H02K 9/19; H02K 9/193; H02K 5/20; H02K 5/203
See application file for complete search history.

(56) References Cited

U.S. PATENT DOCUMENTS

| | | | | |
|---|---|---|---|---|
| 2,862,120 A | * | 11/1958 | Onrud | H02K 5/203 165/47 |
| 2010/0052441 A1 | | 3/2010 | Fukushima | |
| 2011/0181136 A1 | | 7/2011 | Nakamori et al. | |
| 2014/0217842 A1 | * | 8/2014 | Kikuchi | H02K 9/19 310/54 |
| 2023/0116766 A1 | | 4/2023 | Pu et al. | |
| 2023/0198340 A1 | | 6/2023 | Luo et al. | |

FOREIGN PATENT DOCUMENTS

| | | |
|---|---|---|
| CN | 213243760 U | 5/2021 |
| CN | 114448136 A | 5/2022 |
| JP | 5347380 B2 | 11/2013 |

OTHER PUBLICATIONS

European Search Report dated Jan. 25, 2024 in European Patent Office (EPO) Patent Application No. 23191770.9.

* cited by examiner

*Primary Examiner* — Tulsidas C Patel
*Assistant Examiner* — Robert E Mates
(74) *Attorney, Agent, or Firm* — Greenblum & Bernstein, P.L.C.

(57) ABSTRACT

A liquid cooling structure for a motor includes: a casing; an end plate provided at a cylinder end of the casing; a stator; a rotor; and a substantially cylindrical bulkhead extending along a direction of extension of an axis passing through a center of the stator from an inner surface of the end plate such that the bulkhead faces an inner peripheral surface of the casing with a gap therebetween to allow coolant to flow through the gap. The casing has a coolant inlet passing through the casing to guide externally supplied coolant to the gap, the stator includes a stator core having teeth protruding from the inner peripheral portion of the stator core, and coils wound around the respective teeth, and the bulkhead has nozzle hole portions passing therethrough to allow the coolant flowing in the gap to be ejected to an interior space defined by the bulkhead.

11 Claims, 11 Drawing Sheets

LIQUID COOLING STRUCTURE FOR MOTOR

CROSS REFERENCE TO RELATED APPLICATIONS

This application claims the benefit of priority to Japanese Patent Application No. 2022-134221 filed on Aug. 25, 2022, and to Japanese Patent Application No. 2023-096319 filed on Jun. 12, 2023. The entire contents of each of these applications are hereby incorporated herein by reference.

BACKGROUND OF THE INVENTION

1. Field of the Invention

The present invention relates to a liquid cooling structure for a motor for use in, for example, automobiles, agricultural machines, and construction machines.

2. Description of the Related Art

Since an electric motor using a permanent magnet in a rotor, i.e., so-called PM motor, is small and has a high output, the PM motor is used as a driving motor of, for example, automobiles, agricultural machines, construction machines. However, in general, a permanent magnet is demagnetized as the temperature increases, and, when the Curie point is exceeded, the permanent magnet completely loses its magnetic force. Therefore, in a motor of this type, in order to prevent the demagnetization of the motor and maintain normal rotation operation characteristics, efficient cooling of the entire motor is required in a steady operation state. In view of this, a liquid cooling structure that provides large cooling performance per unit volume and that has a high cooling efficiency is widely used in a motor used in, for example, automobiles, agricultural machines, and construction machines.

A liquid cooling structure for a motor disclosed in Japanese Patent No. 5347380 is known. The motor disclosed in Japanese Patent No. 5347380 includes a plurality of separated stator cores, and a plurality of coils that are wound around the corresponding stator cores. The inside of the motor is provided with a plurality of ejection holes through which motor oil (coolant) supplied from an oil inlet (coolant inlet) is ejected in an axial direction of the motor. The ejection holes are disposed in an annular manner in a circumferential direction of the motor at one of opposite ends in the axial direction of the motor, and allow the oil to be ejected onto areas between adjacent stator cores or areas between the coils to cool the motor.

SUMMARY OF THE INVENTION

However, with the liquid cooling structure for a motor as described above, since the oil is ejected in a concentrated manner onto one of the opposite ends in an axial direction (ejection-hole side) of each heat-producing portion such as the stator cores and the coils, the degree of cooing the motor may differ between the one and the other of the opposite ends in the axial direction, and thus desired operation characteristics may not be obtained.

The present invention has been made to solve such problems, and it is an object of one or more embodiments of the present invention to improve cooling performance and to achieve desired operation characteristics of a motor.

The present invention includes the following feature(s) to achieve the object above.

A liquid cooling structure for a motor according to an aspect of the present invention includes: a substantially cylindrical casing; a substantially annular end plate provided in an annular manner at a cylinder end of the casing; a stator housed in the casing; and a rotor held in a hollow portion of the stator such that the rotor is rotatable about an axis passing through a center of the stator; and a substantially cylindrical bulkhead extending along a direction of extension of the axis from an inner surface of the end plate and provided inward of the casing such that the bulkhead faces an inner peripheral surface of the casing with a gap between the bulkhead and the inner peripheral surface to allow coolant to flow through the gap, wherein the casing has a coolant inlet passing through the casing from an outer peripheral surface to the inner peripheral surface of the casing to guide externally supplied coolant to the gap, the stator includes a substantially annular stator core having teeth on an inner peripheral portion of the stator core such that the teeth protrude from the inner peripheral portion of the stator core, and coils wound around the respective teeth at positions inward of the bulkhead, and the bulkhead has nozzle hole portions passing through the bulkhead from an outer peripheral surface to an inner peripheral surface of the bulkhead and arranged in a circumferential direction over an entire circumference of the bulkhead to allow the coolant flowing in the gap to be ejected to an interior space defined by the bulkhead.

The nozzle hole portions may be arranged at regular intervals in the circumferential direction of the bulkhead.

The coils may include coil ends protruding along the direction of extension of the axis from the teeth. The nozzle hole portions may extend along a radial direction of the stator inward such that the nozzle hole portions are directed to the coil ends.

The gap may have a flow-path width in a radial direction of the bulkhead that decreases with increasing distance from the coolant inlet.

The bulkhead may have a peripheral-wall thickness in a radial direction of the bulkhead that increases with increasing distance from the coolant inlet.

The nozzle hole portions may have a nozzle length in a radial direction of the bulkhead that increases with increasing distance from the coolant inlet.

Each of the nozzle hole portions may have an inlet-side opening and an outlet-side opening, and the inlet-side opening may have an opening diameter that is larger than an opening diameter of the outlet-side opening.

Each of the nozzle hole portions may include an inlet-side flow path extending inward along a radial direction of the bulkhead from the inlet-side opening, and an outlet-side flow path extending outward along the radial direction of the bulkhead from the outlet-side opening and in communication with the inlet-side flow path. The inlet-side flow paths of the nozzle hole portions may have a flow-path length in the radial direction of the bulkhead that increases with increasing distance from the coolant inlet.

The outlet-side flow paths may be equal in flow-path length.

The casing may include a stator receiver protruding along a radial direction of the casing inward from the inner peripheral surface of the casing and extending in the form of a ring extending along a middle portion, in the direction of extension of the axis, of the inner peripheral surface of the casing to support the stator. A plurality of the bulkheads may be provided at respective opposite sides of the stator receiver such that the plurality of bulkheads are located outward of the stator receiver along the direction of extension of the axis. The stator receiver may have a guide groove branching from the coolant inlet to reach the gap radially outward of each of the plurality of bulkheads.

The liquid cooling structure may further include a connecting pin to connect and secure the bulkhead to the casing. The casing and the bulkhead may each have a pin insertion portion to hold the connecting pin.

The stator may include one or more pin engagement portions for engagement with one or more body portions of one or more of the connecting pins, the one or more pin engagement portions extending in the direction of extension of the axis along an outer peripheral surface of the stator core.

One of the one or more pin engagement portions may be located in the outer peripheral surface of the stator core such that the one of the one or more pin engagement portions faces toward the coolant inlet.

One of or another of the one or more pin engagement portions may be located in the outer peripheral surface of the stator core on an opposite side of the axis from the coolant inlet.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
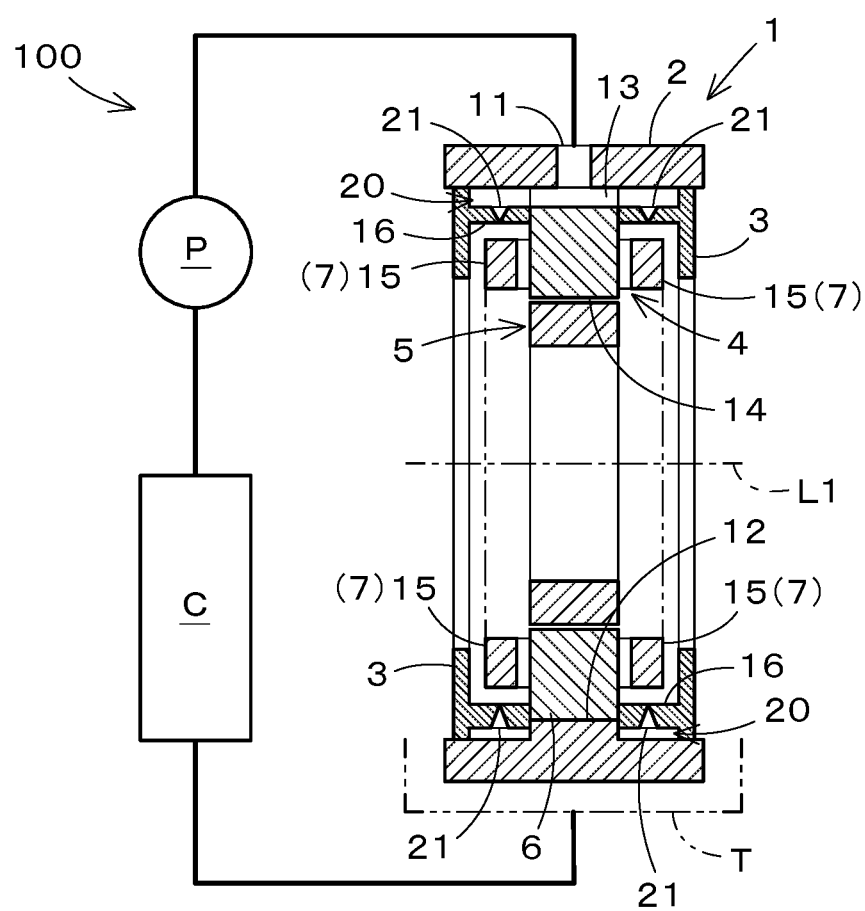
FIG. 1 schematically illustrates a configuration of a coolant circulation circuit.
Figure 2:
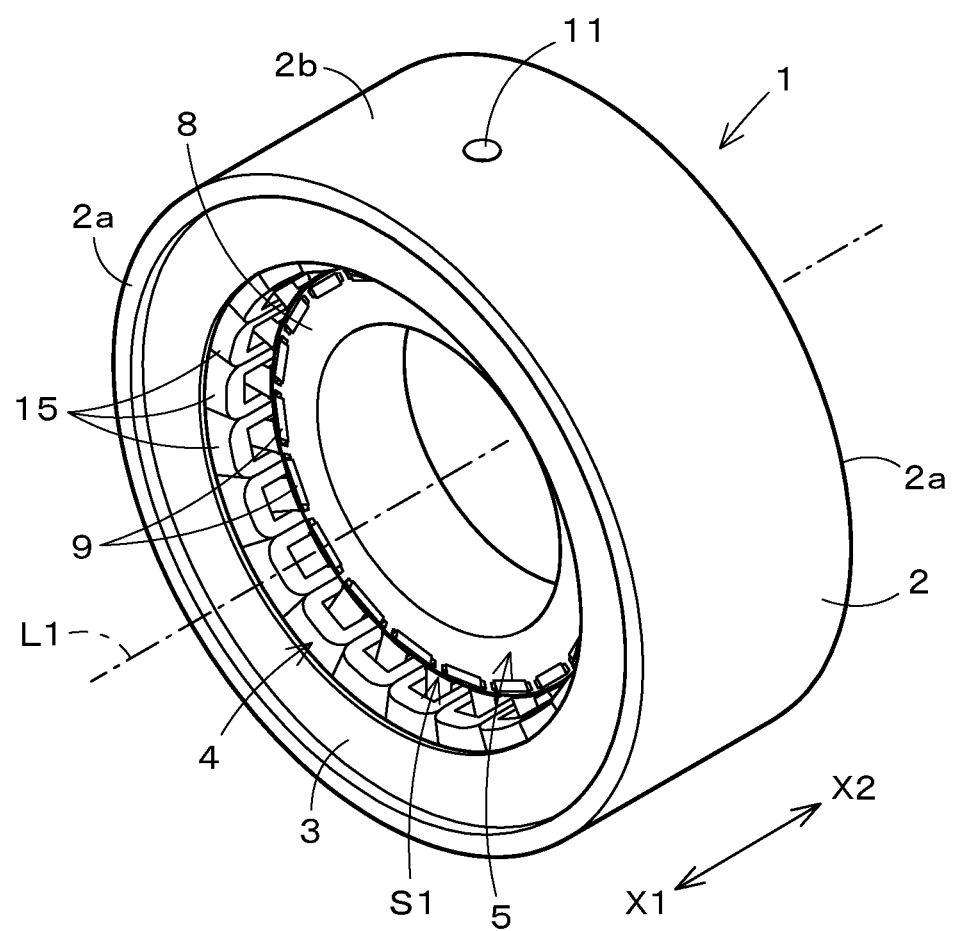
FIG. 2 is a perspective view schematically illustrating a configuration of a motor.

The preferred embodiments will now be described with reference to the accompanying drawings, wherein like reference numerals designate corresponding or identical elements throughout the various drawings. The drawings are to be viewed in an orientation in which the reference numerals are viewed correctly.

Embodiments of the present invention are described below with reference to the drawings. A motor of the present embodiment is mainly used in, for example, an automobile, an agricultural machine, or a construction machine. Specifically, the motor is used as a driving motor for a hydraulic pump or as a motor generator that functions as a prime mover and a generator. Note that, as coolant that cools the motor, for example, an automatic transmission fluid, or so-called ATF, is used.

As illustrated in FIG. 1, a motor 1 of the present embodiment is included in a coolant circulation circuit 100 that includes a coolant storage T, an oil pump P, and a heat exchanger C. The oil pump P sucks coolant stored in the coolant storage T and supplies the coolant to the motor 1. The heat exchanger C cools, by heat exchange, the coolant sucked from the coolant storage T by the oil pump P. Note that the heat exchanger C of the present embodiment is a liquid-cooling heat exchanger, and cools the coolant (primary coolant) that circulates in the coolant circulation circuit 100 by heat exchange with a secondary coolant that circulates and is cooled in a secondary circuit that differs from the coolant circulation circuit 100. In the coolant circulation circuit 100 illustrated in FIG. 1, the heat exchanger C is located in a flow path to allow the coolant to be introduced from the coolant storage T into the oil pump P (at the suction side of the oil pump P). Note, however, that the heat exchanger C may be located in a flow path to allow coolant to flow from the oil pump P to the motor 1 (at the delivery side of the oil pump P).

As illustrated in FIGS. 2 to 5, the motor 1 of the present embodiment includes a casing 2, end plate(s) 3, a stator 4, and a rotor 5. The casing 2 is substantially in the form of a cylinder having open cylinder ends 2a. The end plates 3 are each a substantially annular plate body, and provided within a corresponding one of the cylinder ends 2a of the casing 2 in an annular manner. The stator 4 is a substantially annular member including a stator core 6 and coil(s) 7, and is housed and fixed in the casing 2. The rotor 5 is a substantially annular member including a rotor core 8 and magnet(s) 9, and is held in a hollow portion S1 of the stator 4 such that the rotor 5 is rotatable about an axis L1 passing through the center of the stator 4. Note that, in the present embodiment, the direction of extension of the axis L1 (the direction indicated by arrows X1 and X2 in FIGS. 2 to 4, near-far direction in FIG. 5) is referred to as an axial direction, and a direction orthogonal to the axis L1 is described as a radial direction.

A peripheral wall 2b of the casing 2 (which hereinafter may be referred to as "a case peripheral wall 2b") has a coolant inlet 11. The coolant inlet 11 is a hole for introduction of an externally supplied coolant into the casing 2, is provided in the middle of the case peripheral wall 2b in the axial direction, and extends through the case peripheral wall 2b from an outer peripheral surface to an inner peripheral surface of the case peripheral wall 2b. Note that, as long as coolant can be properly introduced into the casing 2, the coolant inlet 11 may be provided at any position on the case peripheral wall 2b between the middle and either one of the cylinder ends 2a.

Figure 3:
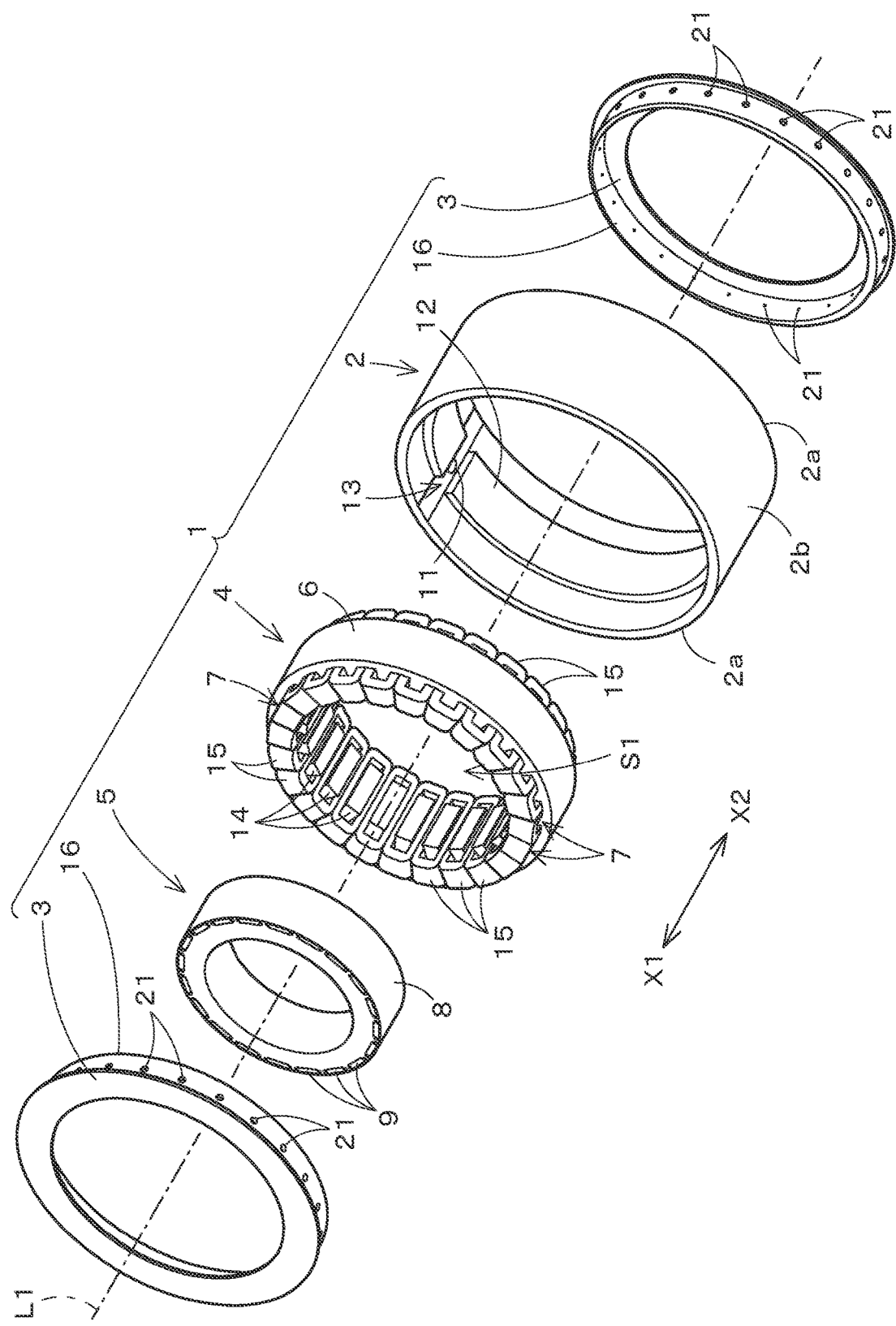
FIG. 3 is an exploded perspective view schematically illustrating the configuration of the motor.
Figure 4:
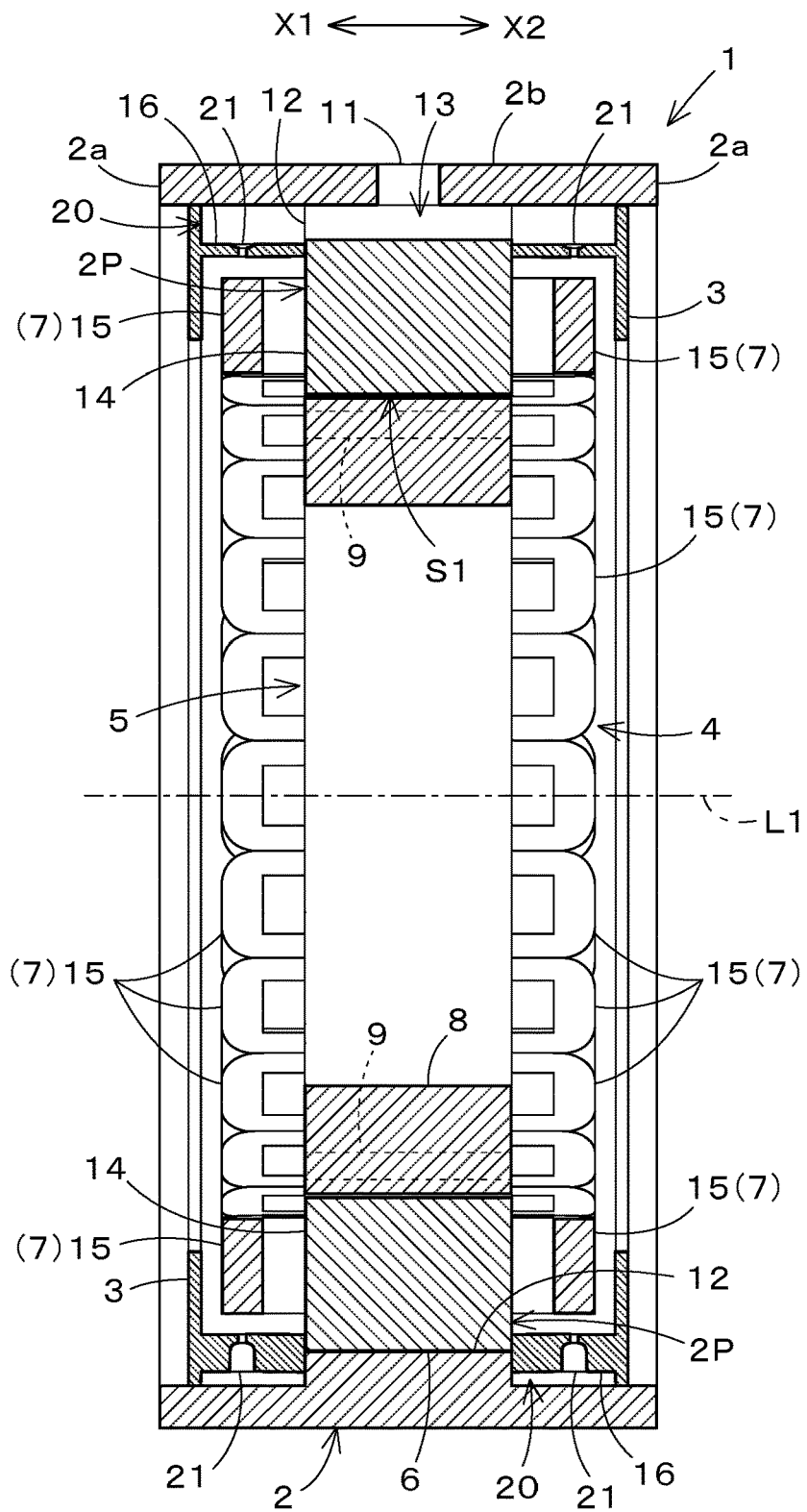
FIG. 4 is an axial cross-sectional view schematically illustrating the configuration of the motor.
Figure 5:
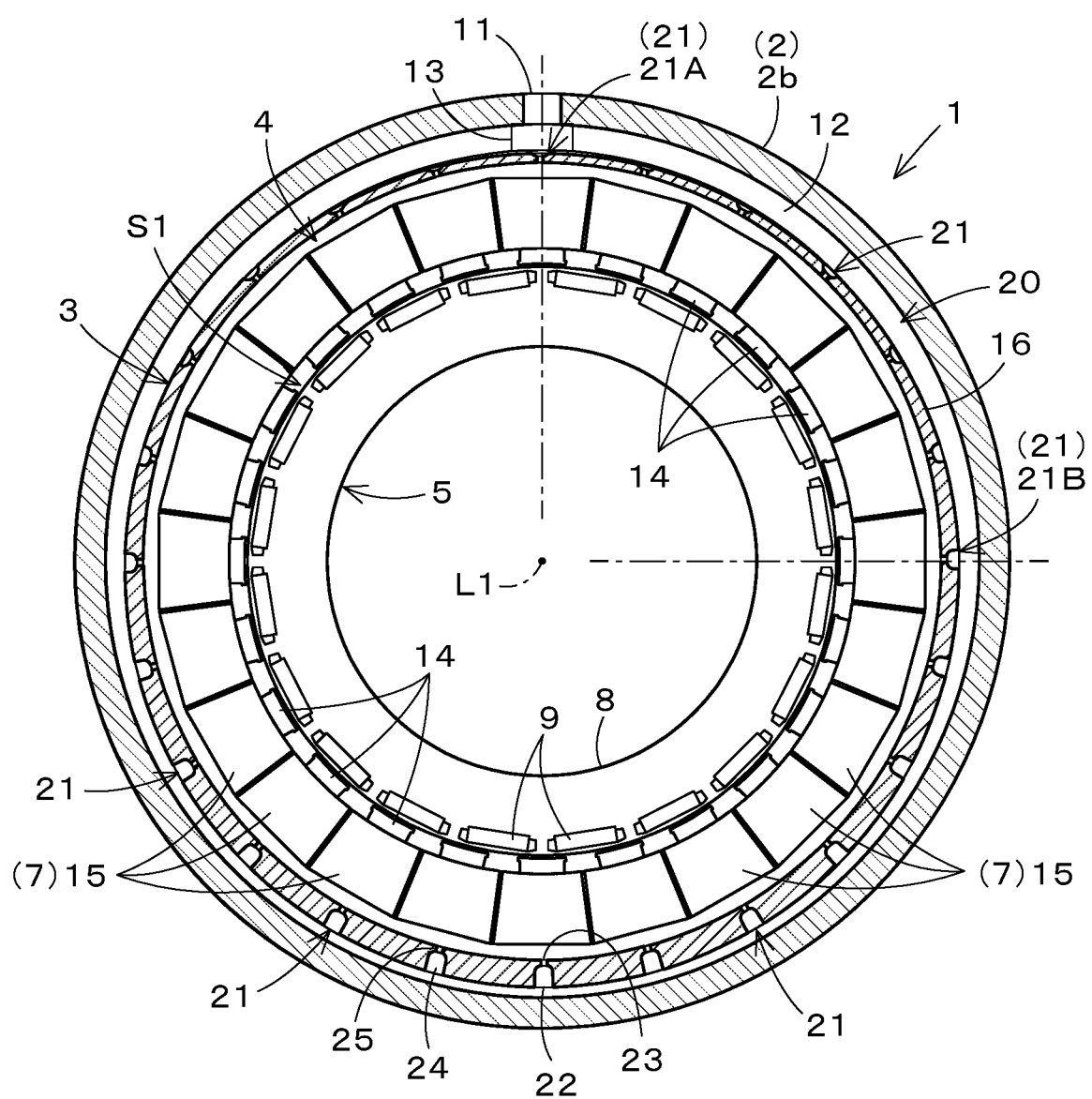
FIG. 5 is a radial cross-sectional view schematically illustrating the configuration of the motor.

As illustrated in FIGS. 3 to 5, a stator receiver 12 is provided on the inner peripheral surface of the case peripheral wall 2b. The stator receiver 12 is in the form of an annular band extending along the inner peripheral surface of the case peripheral wall 2b, and protrudes along a radial direction of the case peripheral wall 2b inward from the inner peripheral surface of the case peripheral wall 2b to support the stator 4. A guide groove 13 is provided in a portion of the stator receiver 12 where the coolant inlet 11 is present. The guide groove 13 extends from the portion where the coolant inlet 11 is present in opposite outward directions along the axial direction, and connects the coolant inlet 11 and gap(s) 20 (described later) inside the casing 2.

The stator 4 includes the stator core 6 and the coil(s) 7. The stator core 6 is a substantially annular thick plate including a plurality of substantially annular steel plates stacked together in the axial direction. An outer peripheral surface of the stator core 6 makes surface contact with the inner peripheral surface of the stator receiver 12 from the radially inner side such that the outer peripheral surface is supported by the inner peripheral surface of the stator receiver 12. The dimension of the stator core 6 in the axial direction is the same as the dimension of the stator receiver 12 in the axial direction. Therefore, outer end surfaces of the stator core 6 in the axial direction are flush with outer end surfaces of the stator receiver 12 in the axial direction (see FIG. 4). Annular flat portions (which may hereinafter be referred to as "inner ring portions") 2P that are formed inside the case peripheral wall 2b by the outer end surfaces of the stator core 6 in the axial direction and the outer end surfaces of the stator receiver 12 in the axial direction face their corresponding end plates 3 from the axially inner side (see FIG. 4).

Teeth 14 that protrude in radial directions are provided on an inner peripheral portion of the stator core 6. The teeth 14 are arranged at regular intervals in a circumferential direction over the entire inner peripheral portion of the stator core 6. In the present embodiment, the stator core 6 includes twenty four teeth 14.

The coils 7 are wound around the respective teeth 14. Each coil 7 is wound around a corresponding tooth 14 such that the coil extends to and from opposite outer surfaces of the tooth 14 in the axial direction to form U-shaped coil ends 15 at the outer ends of the tooth 14 in the axial direction. In this way, a plurality of coil ends 15 are arranged at regular intervals in the circumferential direction at each of the outer surfaces of the inner peripheral portion of the stator core 6 in the axial direction. The coil ends 15 are disposed radially inward of the case peripheral wall 2b with a corresponding bulkhead 16 between the coil ends 15 and the case peripheral wall 2b. The details of the bulkhead 16 are described later.

As illustrated in FIGS. 3 and 5, the rotor 5 includes the rotor core 8 and the magnet(s) 9. The rotor core 8 is a cylindrical body having a diameter that is smaller than the diameter of the inner peripheral portion of the stator core 6, and the magnets 9 are embedded in a peripheral wall of the cylindrical body. The dimension of the rotor core 8 in the axial direction is the same as the dimension of the stator core 6 in the axial direction. Therefore, similarly to the opposite outer end surfaces of the stator core 6 in the axial direction, the opposite outer end surfaces of the rotor core 8 in the axial direction are also flush with the opposite outer end surfaces of the stator receiver 12 in the axial direction (see FIG. 4). The magnets 9 are plate-shaped permanent magnets, and are arranged at regular intervals over the entire peripheral wall of the rotor core 8. In the present embodiment, the rotor 5 includes twenty magnets 9.

As illustrated in FIGS. 3 to 5, the motor 1 of the present embodiment includes the bulkhead(s) 16 between the inner peripheral surface of the case peripheral wall 2b and a portion where the coil ends 15 are disposed. Each bulkhead 16 is a cylindrical body having a diameter that is smaller than the diameter of the inner peripheral surface of the case peripheral wall 2b, extends along the axial direction from the inner surface of a corresponding end plate 3 to a corresponding one of the opposite outer end surfaces of the stator receiver 12 in the axial direction and a corresponding one of the opposite outer end surfaces of the stator core 6 in the axial direction, and radially separates a space between the inner peripheral surface of the case peripheral wall 2b and the portion where the coil ends 15 are present. Note that, in the present embodiment, the bulkheads 16 are integral with the inner surfaces of the end plates 3, but the bulkheads 16 may be independent of the end plates 3.

Each bulkhead 16 faces the inner peripheral surface of the casing 2 with a predetermined gap 20 between the bulkhead 16 and the inner peripheral surface. The bulkheads 16 are provided at respective opposite sides of the stator receiver 12. In this way, at each of the opposite sides of the stator receiver 12 in the axial direction in the casing 2, the gap 20 is defined by the inner peripheral surface of the case peripheral wall 2b, the outer peripheral surface of a corresponding bulkhead 16, the inner surface of a corresponding end plate 3, and a corresponding inner ring portion 2P of the case peripheral wall 2b. Note that the coils 7 are wound around the respective teeth 14 at positions inward of the inner peripheral surfaces of the bulkheads 16.

Each gap 20 communicates with the coolant inlet 11 through the guide groove 13. In other words, the guide groove 13 branches from the coolant inlet 11 and is connected to the gaps (which may be hereinafter referred to as "annular flow paths") 20 provided on the opposite sides of the coolant inlet 11 in the axial direction inside the casing 2. Therefore, coolant introduced into the coolant inlet 11 separates into the annular flow paths 20 on the opposite sides of the coolant inlet 11 in the axial direction inside the casing 2 through the guide groove 13.

As illustrated in FIG. 5, each annular flow path 20 extends over the entire circumference along the inner peripheral surface of the case peripheral wall 2b. Each annular flow path 20 is formed such that a flow-path width in the radial direction decreases with increasing distance from the coolant inlet 11. With this, in each annular flow path 20, even at positions far from the coolant inlet 11 (downstream portion), an internal pressure that is equivalent to the internal pressure at positions close to the coolant inlet 11 (upstream portion) is maintained. In this way, each annular flow path 20 is configured such that the internal pressure is uniform over the entire circumference.

In the present embodiment, a peripheral wall of each bulkhead 16 is configured such that its thickness in the radial direction increases with increasing distance from the coolant inlet 11, and thus the flow-path width of a corresponding annular flow path 20 decreases as described above. Specifically, when seen in the axial direction, the center of the outer circumference of each bulkhead 16 is more distant from the coolant inlet 11 than the center of the inner circumference of each bulkhead 16 (i.e., the center of the stator 4 (a point on the axis L1)) is. Therefore, the peripheral-wall thickness of the bulkhead 16 increases with increasing distance from the coolant inlet 11. With this, the flow-path width of a corresponding annular flow path 20 decreases with increasing distance from the coolant inlet 11.

Each bulkhead 16 is provided with nozzle hole portion(s) 21. Each nozzle hole portion 21 is a hole that extends through the bulkhead 16 from the outer peripheral surface to the inner peripheral surface of the bulkhead 16. The nozzle hole portions 21 are arranged at regular intervals in a circumferential direction over the entire circumference of the bulkhead 16. In the present embodiment, the number of nozzle hole portions 21 of each bulkhead 16 is the same as the number (twenty four) of corresponding coil ends 15. The nozzle hole portions 21 extend along the radial direction of the stator 4 inward such that the nozzle hole portions 21 are directed to the coil ends 15. The nozzle hole portions 21 extend through the peripheral wall of the bulkhead 16 from the outer peripheral surface thereof in a direction orthogonal to the axis L1. With this, coolant that is guided to the annular flow path 20 from the coolant inlet 11 through the guide groove 13 is ejected from the nozzle hole portions 21 inward toward the center of the bulkhead 16, and is sprayed onto the coil ends 15. The coolant sprayed onto the coil ends 15 is scattered in the vicinity thereof and contact the surfaces of heat-producing portion(s) such as the stator core 6, and then is discharged to the outside of the casing 2 and is collected in the coolant storage T.

Figure 6:
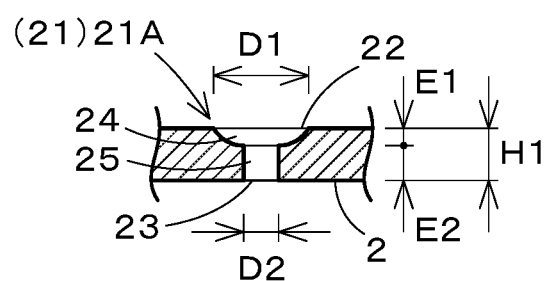
FIG. 6 is a vertical sectional view of an upstream nozzle hole portion.
Figure 7:
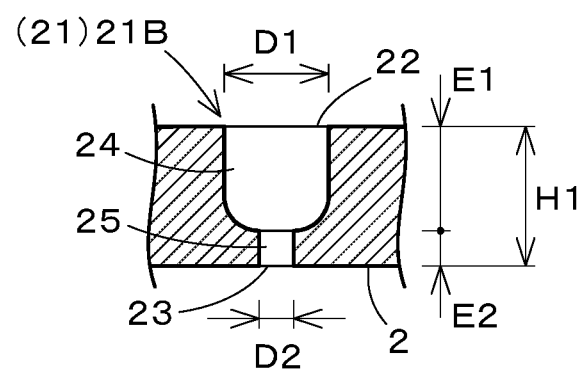
FIG. 7 is a vertical sectional view of a midstream nozzle hole portion.

The nozzle hole portions 21 have a nozzle length H1 in a radial direction of the bulkhead 16 that increases with increasing distance from the coolant inlet 11. Specifically, as illustrated in FIGS. 6 and 7, each nozzle hole portion 21 has an inlet-side opening (nozzle inlet) 22 at the outer peripheral surface (annular flow-path 20 side) of the bulkhead 16, and an outlet-side opening (nozzle outlet) 23 at the inner peripheral surface (coil-end-side) of the bulkhead 16. An opening diameter D1 of the nozzle inlet 22 is larger than an opening diameter D2 of the nozzle outlet 23. For example, the opening diameter D1 of the nozzle inlet 22 is substantially three times as large as the opening diameter D2 of the nozzle outlet 23. With this, the pressure of coolant guided to the nozzle hole portion 21 from the annular flow path 20 is increased while the coolant flows from the nozzle inlet 22 to the nozzle outlet 23, and the coolant is ejected at a flow rate greater than or equal to a prescribed flow rate outward from the nozzle outlet 23.

Each nozzle hole portion 21 includes an inlet-side flow path 24 extending inward along a radial direction of the bulkhead 16 from the nozzle inlet 22 and having a diameter that is substantially the same as the diameter of the nozzle inlet 22, and an outlet-side flow path 25 extending outward along the radial direction of the bulkhead 16 from the nozzle outlet 23, having a diameter that is substantially the same as the diameter of the nozzle outlet 23, and communicating with the inlet-side flow path 24. A downstream-side end portion (end portion opposite from the nozzle inlet 22) of the inlet-side flow path 24 decreases in diameter with decreasing distance to an upstream-side end portion (end portion closer to the outer peripheral side of the bulkhead 16 than the other) of the outlet-side flow path 25 and is connected to the upstream-side end portion.

The inlet-side flow paths 24 of the respective nozzle hole portions 21 have a flow-path length E1 in the radial direction of each bulkhead 16 that increases with increasing distance from the coolant inlet 11. For example, of the nozzle hole portions 21, the flow-path length E1 of the inlet-side flow path 24 of an upstream nozzle hole portion 21A that is closest to the coolant inlet 11 is substantially 1.5 times the opening diameter D2 of the nozzle outlet 23. The flow-path length E1 of the inlet-side flow path 24 of a midstream nozzle hole portion 21B displaced from the upstream nozzle hole portion 21A by an angle of 90 degrees in the circumferential direction of the bulkhead 16 is substantially 4 times the opening diameter D2 of the nozzle outlet 23. With this, even in a nozzle hole portion 21 far from the coolant inlet 11, an internal pressure that is equivalent to the internal pressure of nozzle hole portions 21 close to the coolant inlet 11 is maintained. That is, the nozzle hole portions 21 are configured such that the flow rate at which the coolant is ejected is uniform over the entire circumference. On the contrary, the outlet-side flow paths 25 of the respective nozzle hole portions 21 have the same flow path length E2 in the radial direction of the bulkhead 16. With this, the range of diffusion and the flow rate of coolant ejected from the nozzle outlets 23 in the nozzle hole portions 21 are made uniform.

OTHER EMBODIMENTS

Note that, in the embodiment above, the flow-path width of each annular flow path 20 is changed as described above by displacing the center of the outer circumference of the corresponding bulkhead 16 away from the coolant inlet 11 (increasing the peripheral wall thickness of the corresponding bulkhead 16 outward in the radial direction with increasing distance from the coolant inlet 11). Note, however, that the flow-path width of each annular flow path 20 may be changed as described above by displacing the center of the inner circumference of the case peripheral wall 2b toward the coolant inlet 11 (increasing the thickness of the case peripheral wall 2b inward in the radial direction with increasing distance from the coolant inlet 11).

In the embodiment above, the nozzle hole portions 21 are arranged at regular intervals in the circumferential direction of a corresponding bulkhead 16. Note, however, that as long as coolant can be properly sprayed onto the coil ends 15 and heat-producing portion(s) in the vicinity thereof, the nozzle hole portions 21 may be arranged at different intervals in the circumferential direction of the bulkhead 16, or may not be arranged such that the nozzle hole portions 21 are directed to the coil ends 15.

In the embodiment above, each nozzle hole portion 21 includes two cylindrical portions that are large and small, that is, the inlet-side flow path 24 extending from the large-diameter nozzle inlet 22 and having the same diameter as the large-diameter nozzle inlet 22 and the outlet-side flow path 25 extending from the small-diameter nozzle outlet 23 and having substantially the same diameter as the small-diameter nozzle outlet 23. Note, however, that as long as coolant can be ejected at a flow rate greater than or equal to a prescribed flow rate outward from the nozzle outlet 23, each nozzle hole portion 21 may be in a funnel shape in which the diameter of the outlet-side flow path 25 decreases toward the nozzle outlet 23 from the inlet-side flow path 24, or may be in a funnel shape having a diameter decreasing from the nozzle inlet 22 toward the nozzle outlet 23.

For a liquid cooling structure for a motor 1 according to the above-described embodiment, it is possible to employ a method by which the heated and expanded bulkheads 16 are fitted in an annular manner around the outer peripheral surface of the stator core 6 and then are cooled to fix the bulkheads 16 and the stator core 6 to each other, i.e., so-called "shrink fitting". However, for this method, the steps of heating and cooling the bulkheads 16 are time-consuming and, in addition, assembly errors are likely to occur when the bulkheads 16 are fitted in an annular manner around the outer peripheral surface of the stator core 6 and the nozzle hole portions 21 may not be positioned properly relative to the coil ends 15.

In view of the above, in a liquid cooling structure for a motor 1 as illustrated in FIGS. 8 to 11, the bulkheads 16 are connected and secured to the casing 2 using connecting pin(s) 28 (second example). Specifically, in the liquid cooling structure for a motor 1 of the second example, the casing 2 is substantially in the form of a cylinder having an open cylinder end 2a and provided with a panel portion (wall panel) 2W at the opposite cylinder end 2a. The panel portion 2W covers the stator 4 and the rotor 5 housed in the casing 2 from the direction of extension of the axis L1.

Figure 8:
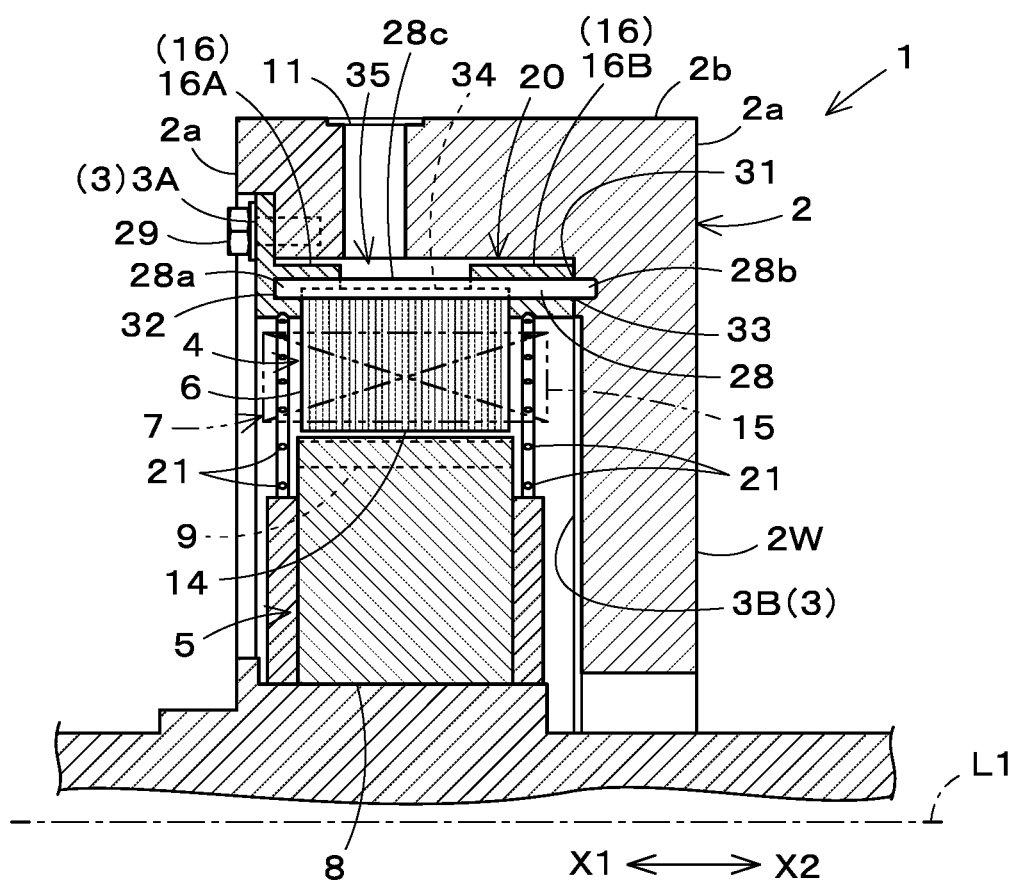
FIG. 8 is an axial cross-sectional view of a connecting pin and its surroundings.
Figure 10:
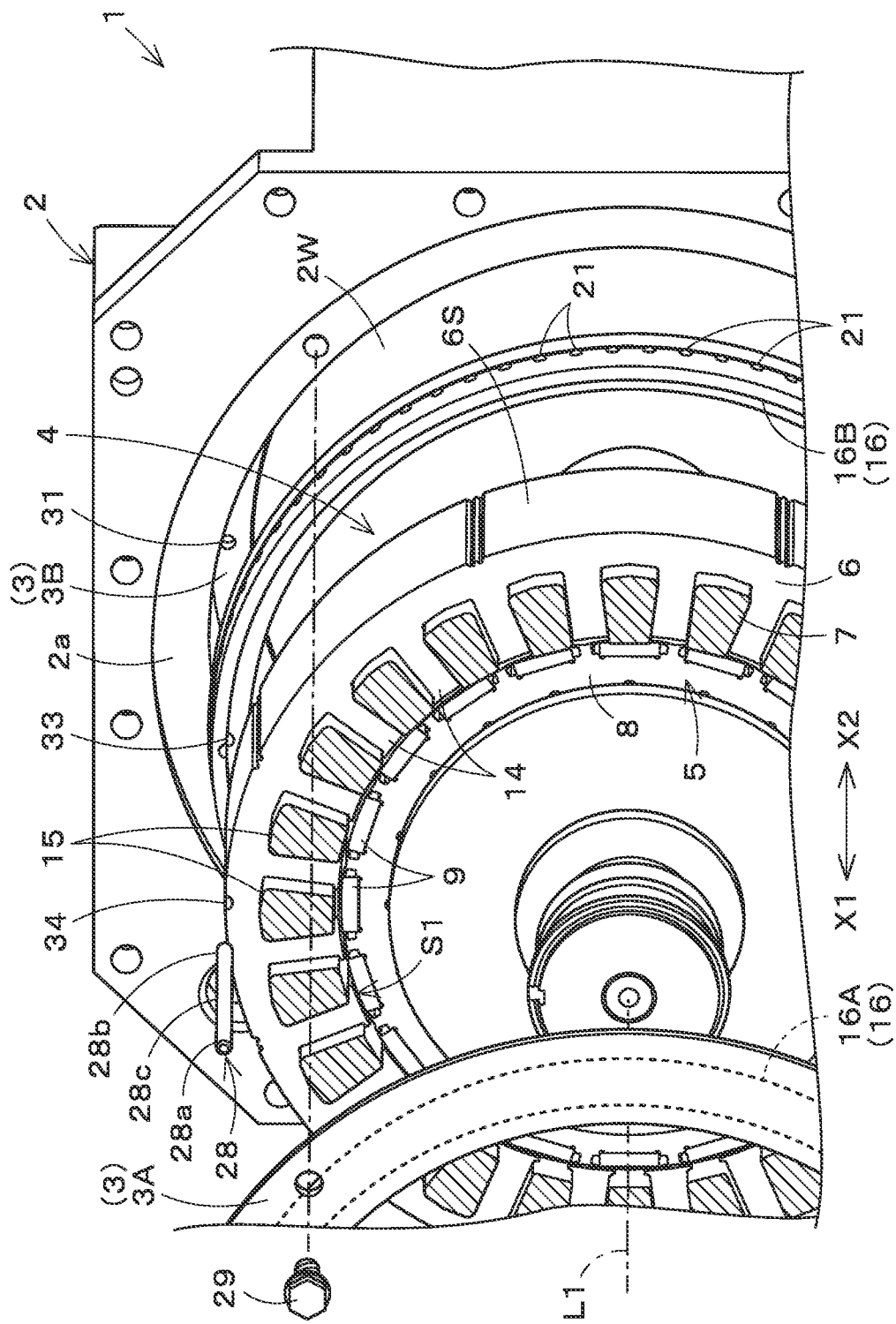
FIG. 10 is an exploded perspective view of a portion of the connecting pin and its surroundings.

As illustrated in FIGS. 8 and 10, a first end plate 3A of the end plates 3 is fixed to the casing 2 with a plurality of (for example, four) fixation bolts 29. In contrast, a second end plate 3B of the end plates 3 is integral with the panel portion 2W of the casing 2.

Figure 9:
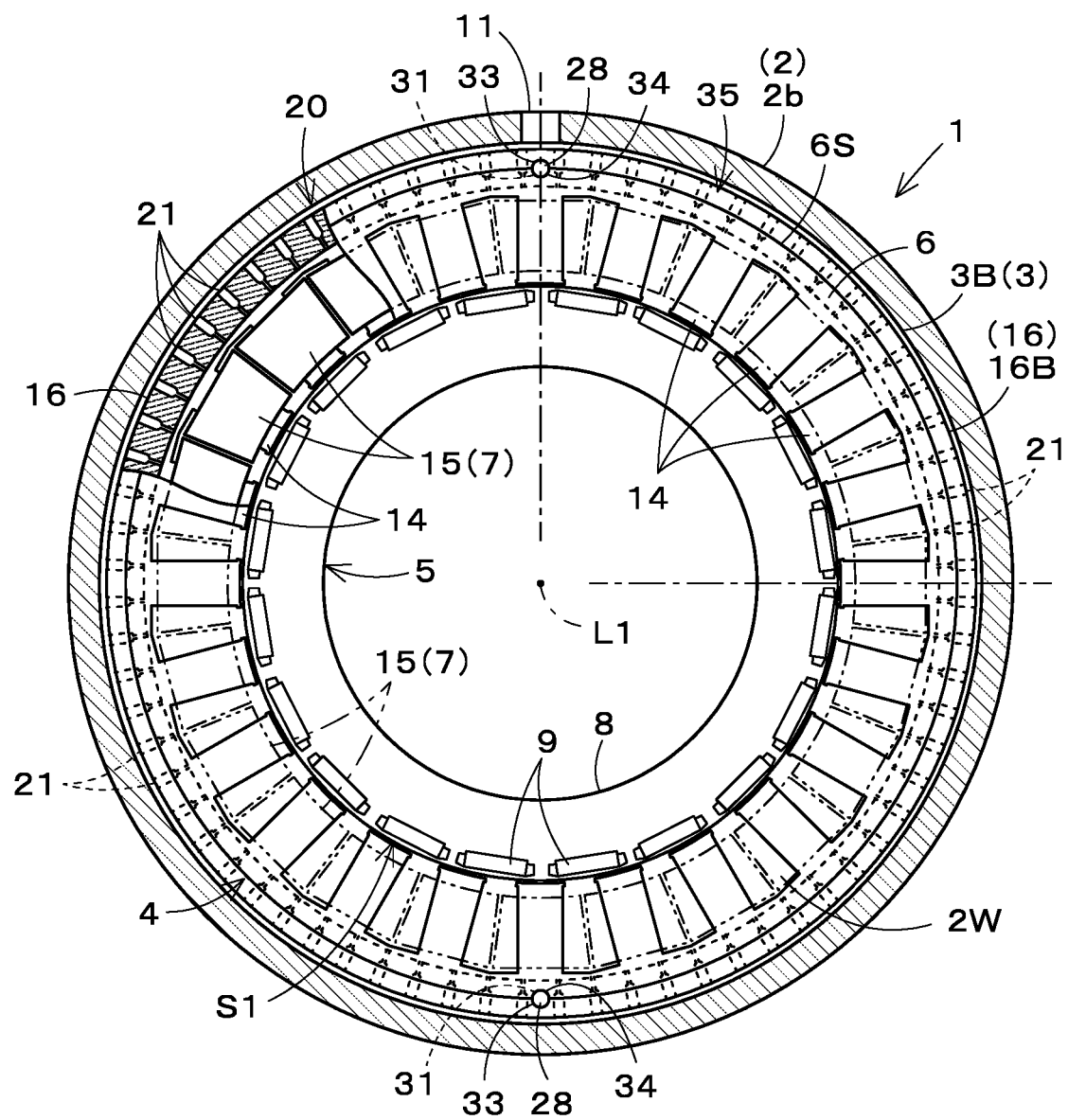
FIG. 9 is a radial cross-sectional view of a motor according to a second example.

As illustrated in FIGS. 8 to 10, the casing 2 includes first pin insertion portion(s) (pin insertion portion(s)) 31. The first pin insertion portion 31 is a circular hole having opposite ends in the direction of extension of the axis L1 one of which is an open end. The first pin insertion portion 31 is in the panel portion 2W of the casing 2. More specifically, the first pin insertion portion 31 is in the second end plate 3B provided along the panel portion 2W. As illustrated in FIG. 9, a pair of the first pin insertion portions 31 are provided in the second end plate 3B on the opposite sides of the axis L1 from each other. The first pin insertion portions 31 are located at a position on the second end plate 3B that is closest to the coolant inlet 11 and a position on the second end plate 3B that is most distant from the coolant inlet 11.

Figure 11:
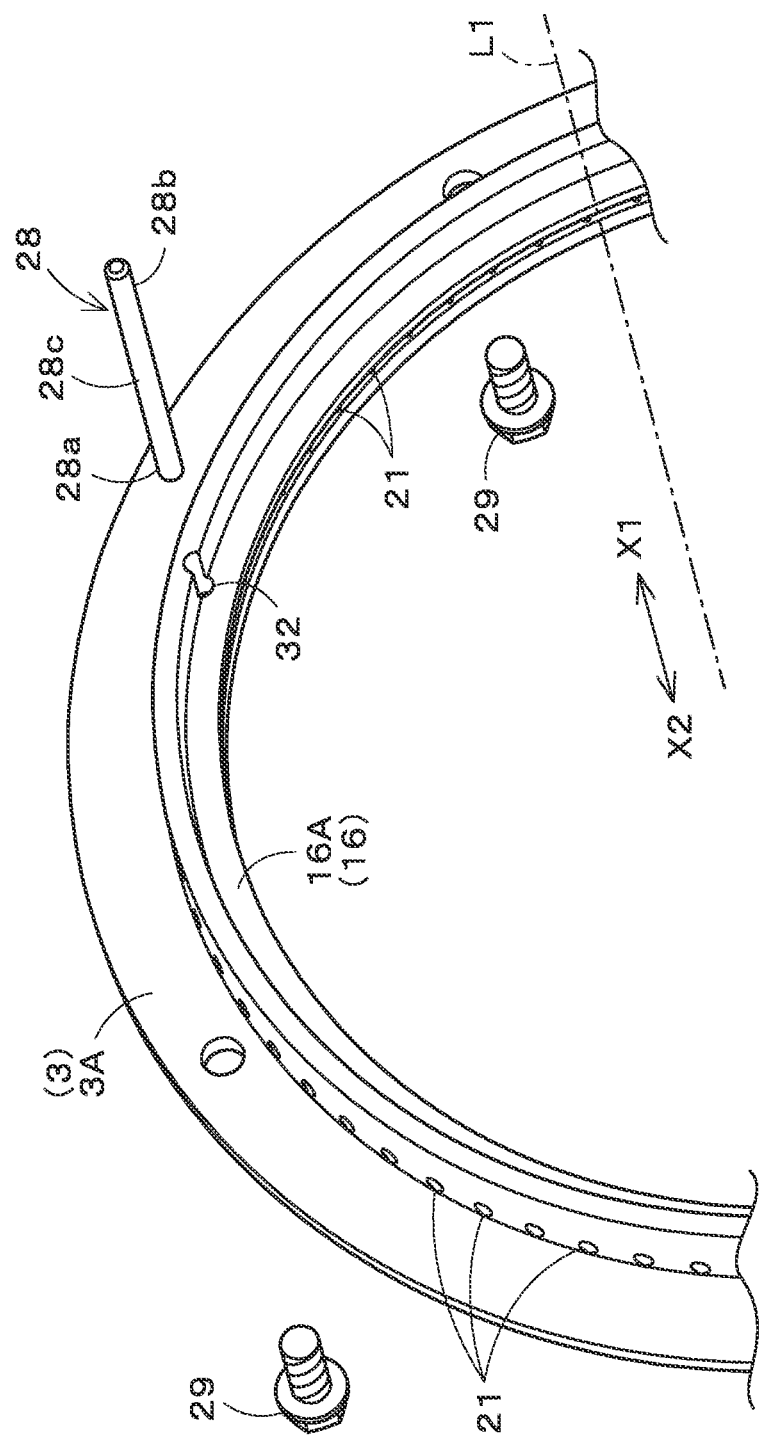
FIG. 11 is a perspective view of a second pin insertion portion and its surroundings.

As illustrated in FIGS. 8 and 10, the bulkheads 16 are provided on the surface of the first end plate 3A that faces the interior of the casing 2 and on the surface of the second end plate 3B that faces the interior of the casing 2. As illustrated in FIGS. 8 and 11, a first bulkhead 16A of the bulkheads 16 is integral with the first end plate 3A. On the contrary, as illustrated in FIGS. 8 and 10, a second bulkhead 16B of the bulkheads 16 is fixed to the second end plate 3B of the panel portion 2W of the casing 2 using connecting pin(s) 28.

As illustrated in FIGS. 8 and 11, the first bulkhead 16A includes second pin insertion portion(s) (pin insertion portion(s)) 32. The second pin insertion portion 32 is a circular hole having opposite ends in the direction of extension of the axis L1 one of which is an open end. A pair of the second pin insertion portions 32 are provided in the first bulkhead 16A on the opposite sides of the axis L1 from each other. That is, the second pin insertion portions 32 are provided such that the second pin insertion portions 32 overlap the first pin insertion portions 31 of the casing 2 as seen in the direction of extension of the axis L1 when the first bulkhead 16A is attached to the casing 2.

As illustrated in FIGS. 8 to 10, the second bulkhead 16B includes third pin insertion portion(s) (pin insertion portion(s)) 33. The third pin insertion portion 33 is a circular through-hole having opposite ends in the direction of extension of the axis L1 both of which are open ends. As illustrated in FIG. 9, a pair of the third pin insertion portions 33 are provided in the second bulkhead 16B on the opposite sides of the axis L1 from each other. That is, the third pin insertion portions 33 are provided such that the third pin insertion portions 33 overlap the first pin insertion portions 31 of the casing 2 as seen from the direction of extension of the axis L1 when the second bulkhead 16B is attached to the casing 2.

As illustrated in FIGS. 8 to 10, the stator 4 includes pin engagement portion(s) 34. The pin engagement portion 34 is a groove having a substantially semicircular radial cross section, and extends in the direction of extension of the axis L1 along an outer peripheral surface 6S of the stator core 6. As illustrated in FIG. 9, a pair of the pin engagement portions 34 are provided in the outer peripheral surface 6S of the stator core 6 on the opposite sides of the axis L1 from each other. That is, the pin engagement portions 34 are provided such that the pin engagement portions 34 overlap the first pin insertion portions 31 of the casing 2 as seen from the direction of extension of the axis L1 when the stator 4 is housed in the casing 2.

Thus, the first pin insertion portions 31 of the casing 2, the third pin insertion portions 33 of the second bulkhead 16B, the pin engagement portions 34 of the stator 4, and the second pin insertion portions 32 of the first bulkhead 16A are configured such that they overlap each other on a straight line in the direction of extension of the axis L1.

As illustrated in FIGS. 8 and 9, the connecting pins 28 are inserted along the direction of extension of the axis L1 into the first pin insertion portions 31, the third pin insertion portions 33, and the second pin insertion portions 32 overlapping each other as described above, and secured and held. The connecting pins 28 are engaged with and held by the pin engagement portions 34.

Specifically, each connecting pin 28 is a shaft in the form of a column, and extends in the direction of extension of the axis L1 in an annular coolant flow path 35 defined by the inner peripheral surface of the case peripheral wall 2b and the outer peripheral surface 6S of the stator core 6. One of the opposite end portions 28a of the connecting pin 28 (the end portion pointing in the direction of arrow X1 in FIG. 10) is press-fitted into a corresponding second pin insertion portion 32 of the first bulkhead 16A. The other of the opposite end portions 28a of the connecting pin 28 (the end portion pointing in the direction of arrow X2 in FIG. 10) is press-fitted in a corresponding first pin insertion portion 31 of the casing 2 through a corresponding third pin insertion portion 33 of the second bulkhead 16B. The body portion 28c of the connecting pin 28 is engaged with a corresponding pin engagement portion 34 of the stator 4 such that the body portion 28c makes surface contact with the pin engagement portion 34 of the stator 4 from the radially outer side of the stator core 6. With this, the first bulkhead 16A and the second bulkhead 16B are connected and secured to the casing 2 such that they are positioned relative to the casing 2 and restricted from rotating relative to the casing 2, and the stator 4 is held in the casing 2 such that the stator 4 is restricted from rotating against the torque of the motor 1.

It is noted here that the body portion 28c of the connecting pin 28 is engaged with the pin engagement portion 34 of the stator 4 such that substantially half the outer peripheral surface of the body portion 28c makes surface contact with the pin engagement portion 34. That is, the connecting pin 28 is engaged with the pin engagement portion 34 such that substantially half the body portion 28c is contained in the pin engagement portion 34. With this, coolant introduced from the coolant inlet 11 into the casing 2 is distributed in circumferential directions of the body portion 28c of the connecting pin 28 located in the coolant flow path 35 such that the connecting pin 28 faces toward the coolant inlet 11 along the outer half of the peripheral surface of the body portion 28c of the connecting pin 28, and guided along the outer peripheral surface 6S of the stator core 6 to the downstream portion of the coolant flow path 35 (opposite side from the coolant inlet 11).

Note that the coolant flow path 35 is in communication with each of the two gaps defined by the casing 2 and the bulkhead 16A or 16B over the entire circumference. Thus, coolant introduced from the coolant inlet 11 to the coolant flow path 35 is distributed to the gaps 20 and then guided to nozzle hole portions 21.

In the liquid cooling structure for a motor 1 of the second example discussed above, the stator 4 is held such that the stator 4 is restricted from rotating relative to the casing 2 using the two connecting pins 28. Note, however, that the stator 4 may be held such that the stator 4 is restricted from rotating relative to the casing 2 using only a single connecting pin 28, provided that the stator 4 can be held in the casing 2 such that the stator 4 is properly restricted from rotating. The stator 4 may be held such that the stator 4 is restricted from rotating relative to the casing 2 using three or more connecting pins 28 depending on the magnitude of the toque of the motor 1.

In the liquid cooling structure for a motor 1 of the second example, the first end plate 3A is fixed to the casing 2 using a plurality of fixation bolts 29. Note, however, that the first end plate 3A may be fixed to the casing 2 using only a single fixation bolt 29, provided that the first end plate 3A can be firmly fixed to the casing 2.

Effects

As has been discussed, a liquid cooling structure for a motor 1 according to one or more embodiments includes: a substantially cylindrical casing 2; a substantially annular end plate 3 provided in an annular manner at a cylinder end 2a of the casing 2; a stator 4 housed in the casing 2; and a rotor 5 held in a hollow portion S1 of the stator 4 such that the rotor 5 is rotatable about an axis L1 passing through a center of the stator 4; and a substantially cylindrical bulkhead 16 extending along a direction of extension of the axis L1 from an inner surface of the end plate 3 and provided inward of the casing 2 such that the bulkhead 16 faces an inner peripheral surface of the casing 2 with a gap 20 between the bulkhead 16 and the inner peripheral surface to allow coolant to flow through the gap 20, wherein the casing 2 has a coolant inlet 11 passing through the casing 2 from an outer peripheral surface to the inner peripheral surface of the casing 2 to guide externally supplied coolant to the gap 20, the stator 4 includes a substantially annular stator core 6 having teeth 14 on an inner peripheral portion of the stator core 6 such that the teeth 14 protrude from the inner peripheral portion of the stator core 6, and coils 7 wound around the respective teeth 14 at positions inward of the bulkhead 16, and the bulkhead 16 has nozzle hole portions 21 passing through the bulkhead 16 from an outer peripheral surface to an inner peripheral surface of the bulkhead 16 and arranged in a circumferential direction over an entire circumference of the bulkhead 16 to allow the coolant flowing in the gap 20 to be ejected to an interior space defined by the bulkhead 16.

With the configuration, since the coolant that is externally supplied to the gap (annular flow path) 20 located inward of the casing 2 through the coolant inlet 11 can be uniformly ejected onto the coils 7 and heat-producing portions in the vicinity thereof from locations radially outward of the coils 7, the degree of cooling of the motor 1 is less likely to be uneven between opposite sides of the axis, and the entire motor 1 can be uniformly cooled. That is, cooling performance is improved. This makes it possible to achieve desired operation characteristics of the motor 1.

The nozzle hole portions 21 may be arranged at regular intervals in the circumferential direction of the bulkhead 16. With the configuration, since the coolant that is supplied to the gap (annular flow path) 20 can be more uniformly ejected onto the coils 7 and heat-producing portions in the vicinity thereof from the locations radially outward of the coils 7, cooling performance is further improved.

The coils 7 may include coil ends 15 protruding along the direction of extension of the axis L1 from the teeth 14. The nozzle hole portions 21 may extend along a radial direction of the stator 4 inward such that the nozzle hole portions 21 are directed to the coil ends 15. With the configuration, since coolant can be directly ejected onto the coil ends 15 which become especially hot, the cooling efficiency is considerably improved. This makes it possible to further improve the operation characteristics of the motor 1.

The gap 20 may have a flow-path width in a radial direction of the bulkhead 16 that decreases with increasing distance from the coolant inlet 11. The configuration makes the internal pressure in the gap (annular flow path) 20 uniform between positions close to the coolant inlet 11 (upstream portion) and positions far from the coolant inlet 11 (downstream portion), and therefore it is possible to more uniformly eject coolant onto heat-producing portions from the nozzle hole portions 21. This further improves cooling performance.

The bulkhead 16 may have a peripheral-wall thickness in a radial direction of the bulkhead 16 that increases with increasing distance from the coolant inlet 11. With the configuration, since the flow-path width of the gap (annular flow path) 20 in the radial direction decreases with increasing distance from the coolant inlet 11, the internal pressure in the gap 20 can be made uniform between positions close to the coolant inlet 11 (upstream portion) and positions far from the coolant inlet 11 (downstream portion). Therefore, it is possible to more uniformly eject coolant onto heat-producing portions from the nozzle hole portions 21. This further improves the cooling performance. Moreover, since this makes it possible to achieve a configuration in which nozzle hole portions 21 in the downstream portion far from the coolant inlet 11 have a nozzle length H1 that is longer than the nozzle length H1 of nozzle hole portions 21 in the upstream portion close to the coolant inlet 11, the ejection pressure of coolant at the nozzle hole portions 21 in the upstream portion and the jetting pressure of coolant at the nozzle hole portions 21 in the downstream portion can be made uniform. Therefore, it is possible to more uniformly eject coolant onto heat-producing portions from the nozzle hole portions 21. This further improves cooling performance.

The nozzle hole portions 21 may have a nozzle length H1 in a radial direction of the bulkhead 16 that increases with increasing distance from the coolant inlet 11. With the configuration, since the ejection pressure of coolant at nozzle hole portions 21 in the upstream portion close to the coolant inlet 11 and the ejection pressure of coolant at nozzle hole portions 21 in the downstream portion far from the coolant inlet 11 can be made uniform, the cooling performance is further improved.

Each of the nozzle hole portions 21 may have an inlet-side opening 22 and an outlet-side opening 23, and the inlet-side opening 22 may have an opening diameter that is larger than an opening diameter of the outlet-side opening 23. With the configuration, since the pressure of the coolant supplied to the gap (annular flow path) 20 is increased while the coolant flows from the inlet-side opening (nozzle inlet) 22 to the outlet-side opening (nozzle outlet) 23 of each nozzle hole portion 21 and the coolant is ejected outward from the nozzle outlet 23, it is possible to more reliably eject the coolant onto heat-producing portions. This further improves cooling performance.

Each of the nozzle hole portions 21 may include an inlet-side flow path 24 extending inward along a radial direction of the bulkhead 16 from the inlet-side opening 22, and an outlet-side flow path 25 extending outward along the radial direction of the bulkhead 16 from the outlet-side opening 23 and in communication with the inlet-side flow path 24. The inlet-side flow paths 24 of the nozzle hole portions 21 may have a flow-path length E1 in the radial direction of the bulkhead 16 that increases with increasing distance from the coolant inlet 11.

With the configuration, since the pressure of the coolant supplied to the gap (annular flow path) 20 is increased while the coolant flows from the inlet-side flow path 24 to the outlet-side flow path 25 and the coolant is ejected outward from the outlet-side opening (nozzle outlet) 23, it is possible to more reliably eject the coolant onto heat-producing portions. This further improves cooling performance. Moreover, since this makes it possible to achieve a configuration in which the ejection pressure of coolant at nozzle hole portions 21 in the upstream portion close to the coolant inlet 11 and the ejection pressure of coolant at nozzle hole portions 21 in the downstream portion far from the coolant inlet 11 can be made uniform, cooling performance is further improved.

In the liquid cooling structure for a motor 1, the outlet-side flow paths 25 may be equal in flow-path length E2. With the configuration, since the ejection resistance of coolant can be made uniform at the outlet-side openings (nozzle outlets) 23 of the respective nozzle hole portions 21, it is possible to more uniformly eject the coolant onto heat-producing portions. This further improves cooling performance.

The casing 2 may include a stator receiver 12 protruding along a radial direction of the casing 2 inward from the inner peripheral surface of the casing 2 and extending in the form of a ring extending along a middle portion, in the direction of extension of the axis L1, of the inner peripheral surface of the casing 2 to support the stator 4. A plurality of the bulkheads 16 may be provided at respective opposite sides of the stator receiver 12 such that the plurality of bulkheads 16 are located outward of the stator receiver 12 along the direction of extension of the axis L1. The stator receiver 12 may have a guide groove 13 branching from the coolant inlet 11 to reach the gap 20 radially outward of each of the plurality of bulkheads 16.

With the configuration, since coolant introduced into the coolant inlet 11 can be divided into the gaps (annular flow paths) 20 on opposite sides of the coolant inlet 11 in the direction of extension of the axis L1 (axial direction) inside the casing 2, it is possible to more uniformly eject the coolant onto entire heat-producing portions. This further improves cooling performance.

A liquid cooling structure for a motor 1 according to the second example may include a connecting pin 28 to connect and secure the bulkhead 16 to the casing 2. The casing 2 and the bulkhead 16 may each have a pin insertion portion 31, 32, 33 to hold the connecting pin 28.

With the configuration, the bulkhead 16 is connected to the casing 2 with the connecting pin 28 such that the bulkhead 16 is positioned relative to the casing 2, making it possible to properly position the nozzle hole portions 21 relative to the coil ends 15. This makes it possible to spray coolant accurately to the coils 7 and predetermined positions around the coils 7. This further improves cooling performance. Furthermore, it is possible to reduce time and effort to attach the bulkhead 16 to the casing 2, thus improving productivity.

The stator 4 may include one or more pin engagement portions 34 for engagement with one or more body portions 28c of one or more of the connecting pins 28, the one or more pin engagement portions 34 extending in the direction of extension of the axis L1 along an outer peripheral surface 6S of the stator core 6.

With the configuration, the stator 4 is engaged and held such that the stator 4 is restricted from rotating relative to the connecting pin(s) 28, making it possible to properly position the coil ends 15 relative to the nozzle hole portions 21. This makes it possible to spray coolant accurately to the coils 7 and predetermined positions around the coils 7. This further improves cooling performance.

One of the one or more pin engagement portions 34 may be located in the outer peripheral surface 6S of the stator core 6 such that the one of the one or more pin engagement portions 34 faces toward the coolant inlet 11.

With the configuration, the coolant introduced from the coolant inlet 11 into the casing 2 is distributed along the body portion 28c of the connecting pin 28 located such that the connecting pin 28 faces toward the coolant inlet 11 in circumferential direction of the body portion 28c, and guided to the outer peripheral surface 6S of the stator core 6, making it possible to uniformly supply coolant to the entire outer peripheral surface 6S of the stator core 6. This further improves cooling performance.

One of or another of the pin engagement portions 34 may be located in the outer peripheral surface 6S of the stator core 6 on an opposite side of the axis L1 from the coolant inlet 11.

With the configuration, when the coolant introduced from the coolant inlet 11 into the casing 2 flows along the outer peripheral surface 6S of the stator core 6, the connecting pin 28 is less likely to hinder the coolant flow, thus making it possible to stably spray the coolant from the nozzle hole portions 21 to the coils 7 and heat-producing portions in the vicinity thereof. This further improves cooling performance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A liquid cooling structure for a motor, the liquid cooling structure comprising:
   a substantially cylindrical casing;
   a substantially annular end plate provided in an annular manner at a cylinder end of the casing;
   a stator housed in the casing;
   a rotor held in a hollow portion of the stator such that the rotor is rotatable about an axis passing through a center of the stator; and
   a substantially cylindrical bulkhead extending along a direction of extension of the axis from an inner surface of the end plate and provided inward of the casing such that the bulkhead faces an inner peripheral surface of the casing with a gap between the bulkhead and the inner peripheral surface to allow coolant to flow through the gap, wherein
   the casing has a coolant inlet passing through the casing from an outer peripheral surface to the inner peripheral surface of the casing to guide externally supplied coolant to the gap,
   the stator includes
      a substantially annular stator core having teeth on an inner peripheral portion of the stator core such that the teeth protrude from the inner peripheral portion of the stator core, and
      coils wound around the respective teeth at positions inward of the bulkhead, and
   the bulkhead has nozzle hole portions passing through the bulkhead from an outer peripheral surface to an inner peripheral surface of the bulkhead and arranged in a circumferential direction over an entire circumference of the bulkhead to allow the coolant flowing in the gap to be ejected to an interior space defined by the bulkhead, and the bulkhead has a peripheral-wall thickness in a radial direction of the bulkhead that increases with increasing distance from the coolant inlet.

2. A liquid cooling structure for a motor, the liquid cooling structure comprising:
a substantially cylindrical casing;
a substantially annular end plate provided in an annular manner at a cylinder end of the casing;
a stator housed in the casing;
a rotor held in a hollow portion of the stator such that the rotor is rotatable about an axis passing through a center of the stator; and
a substantially cylindrical bulkhead extending along a direction of extension of the axis from an inner surface of the end plate and provided inward of the casing such that the bulkhead faces an inner peripheral surface of the casing with a gap between the bulkhead and the inner peripheral surface to allow coolant to flow through the gap, wherein
the casing has a coolant inlet passing through the casing from an outer peripheral surface to the inner peripheral surface of the casing to guide externally supplied coolant to the gap,
the stator includes
a substantially annular stator core having teeth on an inner peripheral portion of the stator core such that the teeth protrude from the inner peripheral portion of the stator core, and
coils wound around the respective teeth at positions inward of the bulkhead, and
the bulkhead has nozzle hole portions passing through the bulkhead from an outer peripheral surface to an inner peripheral surface of the bulkhead and arranged in a circumferential direction over an entire circumference of the bulkhead to allow the coolant flowing in the gap to be ejected to an interior space defined by the bulkhead, and
the nozzle hole portions have a nozzle length in a radial direction of the bulkhead that increases with increasing distance from the coolant inlet.

3. The liquid cooling structure according to claim 2, wherein
each of the nozzle hole portions has an inlet-side opening and an outlet-side opening, and the inlet-side opening has an opening diameter that is larger than an opening diameter of the outlet-side opening.

4. The liquid cooling structure according to claim 3, wherein
each of the nozzle hole portions includes
an inlet-side flow path extending inward along the radial direction of the bulkhead from the inlet-side opening, and
an outlet-side flow path extending outward along the radial direction of the bulkhead from the outlet-side opening and in communication with the inlet-side flow path, and
the inlet-side flow paths of the nozzle hole portions have a flow-path length in the radial direction of the bulkhead that increases with increasing distance from the coolant inlet.

5. The liquid cooling structure according to claim 4, wherein
the outlet-side flow paths are equal in flow-path length.

6. The liquid cooling structure according to claim 2, wherein
the casing includes a stator receiver protruding along a radial direction of the casing inward from the inner peripheral surface of the casing and extending in the form of a ring extending along a middle portion, in the direction of extension of the axis, of the inner peripheral surface of the casing to support the stator,
a plurality of the bulkheads are provided at respective opposite sides of the stator receiver such that the plurality of bulkheads are located outward of the stator receiver along the direction of extension of the axis, and
the stator receiver has a guide groove branching from the coolant inlet to reach the gap radially outward of each of the plurality of bulkheads.

7. A liquid cooling structure for a motor, the liquid cooling structure comprising:
a substantially cylindrical casing;
a substantially annular end plate provided in an annular manner at a cylinder end of the casing;
a stator housed in the casing;
a rotor held in a hollow portion of the stator such that the rotor is rotatable about an axis passing through a center of the stator; and
a substantially cylindrical bulkhead extending along a direction of extension of the axis from an inner surface of the end plate and provided inward of the casing such that the bulkhead faces an inner peripheral surface of the casing with a gap between the bulkhead and the inner peripheral surface to allow coolant to flow through the gap, wherein
the casing has a coolant inlet passing through the casing from an outer peripheral surface to the inner peripheral surface of the casing to guide externally supplied coolant to the gap,
the stator includes
a substantially annular stator core having teeth on an inner peripheral portion of the stator core such that the teeth protrude from the inner peripheral portion of the stator core, and
coils wound around the respective teeth at positions inward of the bulkhead, and
the bulkhead has nozzle hole portions passing through the bulkhead from an outer peripheral surface to an inner peripheral surface of the bulkhead and arranged in a circumferential direction over an entire circumference of the bulkhead to allow the coolant flowing in the gap to be ejected to an interior space defined by the bulkhead,
the liquid cooling structure, further includes a connecting pin to connect and secure the bulkhead to the casing, and
the casing and the bulkhead each have a pin insertion portion to hold the connecting pin.

8. The liquid cooling structure according to claim 7, wherein the stator includes one or more pin engagement portions for engagement with one or more body portions of one or more of the connecting pins, the one or more pin engagement portions extending in the direction of extension of the axis along an outer peripheral surface of the stator core.

9. The liquid cooling structure according to claim 8, wherein one of the one or more pin engagement portions is located in the outer peripheral surface of the stator core such that the one of the one or more pin engagement portions faces toward the coolant inlet.

10. The liquid cooling structure according to claim 8, wherein one of the one or more pin engagement portions is located in the outer peripheral surface of the stator core on an opposite side of the axis from the coolant inlet.

11. The liquid cooling structure according to claim 9, wherein another of the one or more pin engagement portions is located in the outer peripheral surface of the stator core on an opposite side of the axis from the coolant inlet.

* * * * *